(12) United States Patent
Siryon

(10) Patent No.: US 8,792,230 B2
(45) Date of Patent: Jul. 29, 2014

(54) LAPTOP WITH HOME OFFICE CAPABILITIES

(76) Inventor: Duannah Siryon, Brooklyn Park, MN (US)

( * ) Notice: Subject to any disclaimer, the term of this patent is extended or adjusted under 35 U.S.C. 154(b) by 208 days.

(21) Appl. No.: 13/468,036

(22) Filed: May 10, 2012

(65) Prior Publication Data

US 2013/0301191 A1 Nov. 14, 2013

(51) Int. Cl.
*G06F 1/16* (2006.01)

(52) U.S. Cl.
USPC ............... 361/679.1; 248/286.1; 206/320; 345/173

(58) Field of Classification Search
USPC .......... 361/679.1, 679.27, 679.09, 679.08, 361/679.54, 679.01, 679.28, 679.17, 361/679.55, 679.41, 679.02, 679.23; 206/320, 45.25, 45.24, 778, 449, 232, 206/521.1, 216; 312/323, 293.1, 237, 312/319.2, 223.1, 223.2, 334.46; 345/501, 345/173, 589, 545, 156, 633, 649
See application file for complete search history.

(56) References Cited

U.S. PATENT DOCUMENTS

| | | | |
|---|---|---|---|
| 6,266,236 B1* | 7/2001 | Ku et al. | 361/679.27 |
| 2013/0128441 A1* | 5/2013 | Lee et al. | 361/679.09 |
| 2013/0134061 A1* | 5/2013 | Wu et al. | 206/320 |

* cited by examiner

*Primary Examiner* — Hung Duong
(74) *Attorney, Agent, or Firm* — The Law Office of Jerry D. Haynes

(57) ABSTRACT

A laptop with home office capabilities comprising a base to house a plurality of internal components, where the base includes a keyboard and mouse pad attached on a top surface; a cover attached on a hinge to a back portion of the base, where the cover includes a display screen, a camera and a light; a plurality of computing accessories attached around the base, where the plurality of computing accessories provide greater functions for a user during use; and a printer/copier/scanner/fax device built within the base, wherein the printer/copier/scanner/fax device includes a paper tray attached to a side of the base and a paper receiving tray attached to an opposing side of the tray to enable the user to print, copy, scan and fax as desired when using the laptop with home office capabilities.

8 Claims, 1 Drawing Sheet

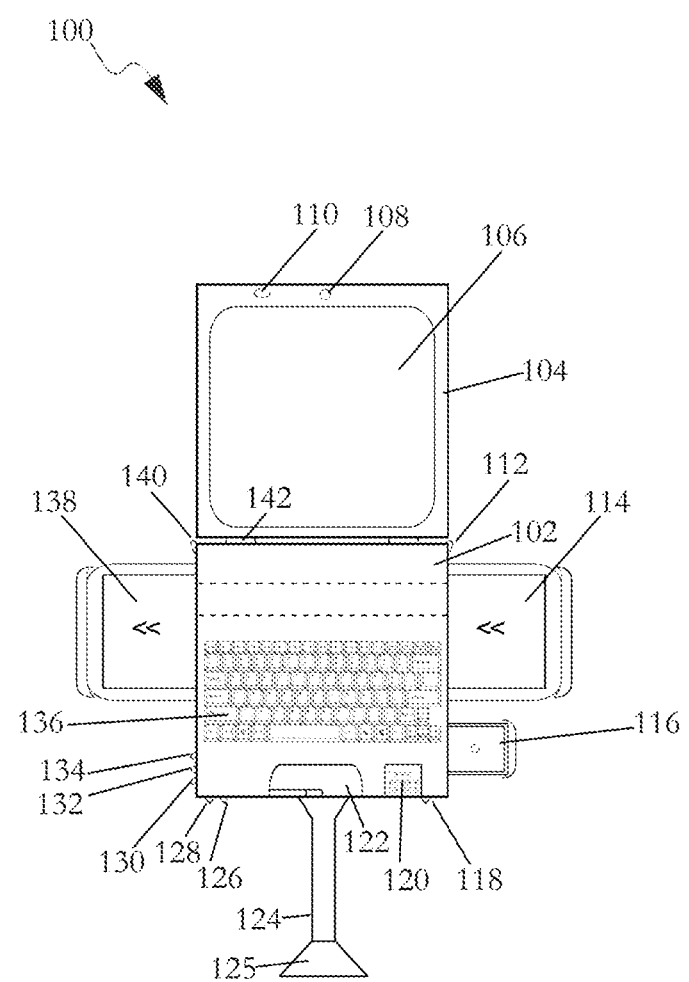

LAPTOP WITH HOME OFFICE CAPABILITIES

CROSS REFERENCE TO OTHER APPLICATIONS

This application claims priority to U.S. Provisional Application Ser. No. 61/480,461 filed on Apr. 29, 2011.

BACKGROUND OF THE INVENTION

1. Field of the Invention

The present invention relates to a laptop computer which includes additional features that enable a user to perform functions like printing, scanning, video recording, audio playing and the like all within the single device.

2. Description of Related Art

In today's fast paced world technology and computing capabilities are continuously growing and expanding. With the development of the laptop computer portable computing capabilities allowed users to perform their computer functions outside of the home or office to any location of their choosing. The laptops are easy to carry, pack into a bag and use both indoors and outdoors all for the user's convenience. With the advantage of portable computing, many people find it troublesome that they must return to an office setting if they have to print, copy, scan or fax a document. Laptops are primarily computing devices and are not equipped to perform the additional features of a home or professional office.

Acknowledging the shortcomings of the common laptop some developments have been made to enable a user to perform additional tasks with their laptop. For example, U.S. Pat. No. 6,597,568 by Martin Dennis Henry Ryder discloses a carrying case for mobile office wherein a briefcase houses a laptop computer connected to a printer to enable a user to compute and print from a remote location. While this mobile office does provide greater flexibility to where a user may print, the laptop and printer are still two items merely connected with a connection cable. Alternatively, U.S. Pat. No. 7,542,284 by Richard M. Wilson discloses a laptop computer with attached printer wherein a laptop has a printer built into the base. The printer includes slots to receive and dispel the paper for printing. This laptop makes up for the short comings of common laptops but still does not perform all of the functions associated with working from an office.

It would be beneficial in the art to provide a laptop computer that enables a user to perform common office tasks like printing, faxing, scanning and copying on within a single device. It would also be desirable in the art to provide a laptop computer that further includes an additional surface that serves as a desk surface upon which the user may write or rest items.

SUMMARY OF THE INVENTION

In view of the foregoing disadvantages inherent in the prior art, the general purpose of the present invention is to provide a laptop with added capabilities, configured to include all of the advantages of the prior art, and to overcome the drawbacks inherent therein.

Accordingly, an object of the present invention is to provide a laptop with printing, copying, faxing and scanning capabilities.

To achieve the above objects, in an aspect of the present invention, a laptop with home office capabilities is described comprising a base to house a plurality of internal components, where the base includes a keyboard and mouse pad attached on a top surface; a cover attached on a hinge to a back portion of the base, where the cover includes a display screen, a camera and a light; a plurality of computing accessories attached around the base, where the plurality of computing accessories provide greater functions for a user during use; and a printer/copier/scanner/fax device built within the base, wherein the printer/copier/scanner/fax device includes a paper tray attached to a side of the base and a paper receiving tray attached to an opposing side of the tray to enable the user to print, copy, scan and fax as desired when using the laptop with home office capabilities.

These together with other aspects of the present invention, along with the various features of novelty that characterize the present invention, are pointed out with particularity in the claims annexed hereto and form a part of this present invention. For a better understanding of the present invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawing in which:

FIG. 1 depicts a perspective view of a laptop with home office capabilities in accordance with an exemplary embodiment of the present invention.

DETAILED DESCRIPTION OF THE DRAWINGS

The present invention relates to a laptop computer which includes additional features that enable a user to perform functions like printing, scanning, video recording, audio playing and the like all within the single device. The present invention provides a laptop with home office capabilities wherein a printer/copier/scanner/fax, camera and CD/DVD player are built into the laptop to allow common office functions to be performed with the laptop from any location. The laptop with home office capabilities includes a rechargeable battery and an additional backup battery to allow the user to perform the additional computing functions in any location of their choosing. With all of the additional features, the user is able to perform their work from any location of their choosing without having to return home or to an office to complete their desired tasks.

Turning now descriptively to the drawings, referring to FIG. 1, a perspective view of a laptop with home office capabilities (100) is shown in accordance with an exemplary embodiment of the present invention. The laptop with home office capabilities (100) includes a base (102) that houses a plurality of internal components. The base (102) is attached to a cover (104) with a pair of hinges (142) connected along a backside of the base (102). The cover (104) may open and close against the base (102) utilizing the pair of hinges (142) for movement. When not in use the cover (104) may have a latch or lock that connects the cover (104) to the base (102) and keeps it there until a user presses a release button for detachment.

Positioned against a central portion of the cover (104) is a display screen (106). The display screen (106) is on the side of the cover (104) that faces the base (102). The user utilizes the display screen (106) to view the internet, projects, movies, photos and the like while operating the laptop with home office capabilities (100). The display screen (106) may be an HD screen to allow the user to view images in High Definition.

Along a top portion of the cover (104), positioned above the display screen (106), may be a camera (108). The camera (108) enables the user to record images displayed in front of the camera (108) or display screen (106). The camera (108) may be activated on demand by the user whenever they want to record something. Next to the camera (108) may be a light (110). The light (110) spotlights the items in front of the display screen (106) to better illuminate them for the user and to allow the camera (108) better visibility on the recorded items. Also, the light (110) may illuminate a keyboard (136) attached upon the base (102) to better allow the user to see the keys as they are typing.

Turning focus to the base (102), a plurality of common computing accessories are connected at multiple locations around the base (102). On a side of the base (102), positioned toward a rear portion near the cover (104), may be an Ethernet network port (112). The Ethernet network port (112) enables the user to plug in their Ethernet cable to allow the laptop with home office capabilities (100) to access the internet. Alternatively, the laptop with home office capabilities (100) may include Wi-Fi to allow the laptop (100) to wirelessly connect to the internet. Also, a phone jack (118) may be positioned on the same side of the base (102) as the Ethernet network port (112) to allow the user to plug in a phone cord. The plurality of common computing accessories may further include a memory card receiver (126) which accepts a memory card, a speaker (128) to emit sounds, a mic (130) to record sounds and voices for the camera, a headphone jack (132) to allow the user to plug in their ear/headphones, at least one USB port (134), and a power outlet (140). The plurality of common computing accessories allows the base (102) to perform a great number of functions for user while using the laptop with home office capabilities (100).

Next to the Ethernet network port (112) may be a paper tray (114). The paper tray (114) holds paper that feeds into a printer/copier/fax device built within the base (102). During use, the user may command the printer/copier/scanner/fax device to perform a task using commands on the keyboard (136) or an attached keypad (120). On command, the printer/copier/scanner/fax device pulls paper from the paper tray (114), performs the task within the base (102) and then expels the paper out onto a paper receiving tray (138) at an opposite side of the base (102). Both the paper tray (114) and the paper receiving tray (138) may be retractable into the base (102) for easy storage when the printer/copier/scanner/fax device is not in use.

Next to the paper tray (114) may be a CD/DVD receiving tray (116). The CD/DVD receiving tray (116) extends from the base (102) and allows CDs and DVDs to be inserted and played with a CD/DVD player built within the base (102).

In front of the keyboard (136) is a mouse pad (122) or touchpad attached to a top surface of the base (102). The mouse pad (122) enables the user to control functions displayed on the display screen (106). The mouse pad (122) may include right and left mouse keys to better operate the computing function. On a right side of the mouse pad (122) may be a scroll pad to provide the user with scrolling functions while using the mouse pad (122).

An adjustable table leg stand (124) may be attached beneath the base (102). The stand (124) provides a means to elevate the laptop (100) and helps the user to avoid direct contact with the base (102) of the laptop (100). The laptop (100) may generate heat during operation thus use of the stand (124) helps the user to avoid the direct contact with the hot surface of the base (102). In one particular embodiment, the stand (124) may adjust up to three feet in height. The stand (124) includes a stand base (125) that allows for the placement on a flat surface.

With all of the unique features of the laptop with home office capabilities (100), a user is able to easily perform functions normally limited to the confines of an office at remote locations of their choosing. The user is able to print, copy, scan and fax in all of the locations where a laptop is used. Further, the user is not constrained by finding a platform or tabletop to use the laptop with home office capabilities (100) because the laptop (100) includes its own stand 124 with base (125) for independent support.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

What is claimed is:

1. A laptop with home office capabilities comprising:
   a base to house a plurality of internal components, where said base includes a keyboard and mouse pad attached on a top surface;
   a cover attached on a hinge to a back portion of said base, where said cover includes a display screen, a camera and a light;
   a plurality of computing accessories attached around said base, where said plurality of computing accessories provide greater functions for a user during use; and
   a printer/copier/scanner/fax device built within said base, wherein said printer/copier/scanner/fax device includes a paper tray attached to a side of said base and a paper receiving tray attached to an opposing side of said tray to enable the user to print, copy, scan and fax as desired when using said laptop with home office capabilities.

2. The laptop with home office capabilities according to claim 1, where said base includes a stand attached beneath said base to elevate said laptop.

3. The laptop with home office capabilities according to claim 2, where said stand elevates said laptop 3 feet.

4. The laptop with home office capabilities according to claim 2, where said stand includes a stand base.

5. The laptop with home office capabilities according to claim 1, where said plurality of computing accessories include a phone jack, a memory card receiver, a speaker, a mic, a headphone jack, at least one USB port, and a power outlet.

6. The laptop with home office capabilities according to claim 1, where said base further includes an Ethernet outlet to enable said laptop to connect to the internet.

7. The laptop with home office capabilities according to claim 1, wherein said base includes Wi-Fi to enable said laptop to wirelessly connect to the internet.

8. The laptop with home office capabilities according to claim 1, where said base includes a CD/DVD player to enable said laptop to play CDs and DVDs.

* * * * *